(12) United States Patent
Kumaresan et al.

(10) Patent No.: US 9,875,137 B2
(45) Date of Patent: *Jan. 23, 2018

(54) INTELLIGENT APPLICATION BACK STACK MANAGEMENT

(71) Applicant: Accenture Global Services Limited, Dublin (IE)

(72) Inventors: Senthil Kumaresan, Bangalore (IN); Sanjoy Paul, Bangalore (IN); Nataraj Kuntagod, Bangalore (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/196,936

(22) Filed: Jun. 29, 2016

(65) Prior Publication Data

US 2016/0306656 A1 Oct. 20, 2016

Related U.S. Application Data

(63) Continuation of application No. 14/476,270, filed on Sep. 3, 2014, now Pat. No. 9,405,578.

(30) Foreign Application Priority Data

Jul. 11, 2014 (IN) ............................ 3438/CHE/2014

(51) Int. Cl.
*G06F 9/46* (2006.01)
*G06F 9/48* (2006.01)

(52) U.S. Cl.
CPC .................... *G06F 9/485* (2013.01)

(58) Field of Classification Search
CPC ....................................... G06F 9/485

(Continued)

(56) References Cited

U.S. PATENT DOCUMENTS 4,800,521 A 1/1989 Carter et al.
5,144,692 A * 9/1992 Baker .................. G06F 9/5016
710/1

(Continued)

FOREIGN PATENT DOCUMENTS

EP 1693748 8/2006
EP 2706734 3/2014

OTHER PUBLICATIONS

Kannan et al, "A Software Solution for Dynamic Stack Management on Scratch Pad Memory", IEEE, pp. 612-617, 2009.*

(Continued)

*Primary Examiner* — Anil Khatri
(74) *Attorney, Agent, or Firm* — Mannava & Kang, P.C.

(57) ABSTRACT

Intelligent application back stack management may include generating a first back stack for activities of an application that have been executed by a device that executes the application. The first back stack may include a back stack size limit. A further back stack may be generated for selected ones of the activities of the application if a total number of the activities of the application and further activities of the application exceeds the back stack size limit. The first back stack may be an in-memory back stack for the device that executes the application, and the further back stack may include an external on-device back stack for the device that executes the application and/or a Cloud storage based back stack. Intelligent application back stack management may further include regenerating an activity of the selected ones of the activities that is pulled from the further back stack.

20 Claims, 16 Drawing Sheets

(58) Field of Classification Search
USPC .............................................. 718/1, 100–105
See application file for complete search history.

(56) References Cited

U.S. PATENT DOCUMENTS

| | | | | |
|---|---|---|---|---|
| 5,471,617 | A * | 11/1995 | Farrand | G06F 11/0748 709/223 |
| 6,006,323 | A * | 12/1999 | Ma | G06F 9/30101 712/202 |
| 6,430,570 | B1 | 8/2002 | Judge et al. | |
| 6,606,743 | B1 * | 8/2003 | Raz | G06F 9/30134 711/132 |
| 6,697,868 | B2 | 2/2004 | Craft et al. | |
| 6,973,560 | B1 * | 12/2005 | Rice | G06F 9/4436 712/205 |
| 7,006,963 | B1 * | 2/2006 | Maurer | H04L 41/145 702/186 |
| 7,376,786 | B2 * | 5/2008 | Williams | G06F 3/0611 711/112 |
| 8,010,498 | B2 | 8/2011 | Gounares et al. | |
| 8,327,373 | B2 * | 12/2012 | Srinivasan | G06F 9/5005 709/226 |
| 8,448,170 | B2 | 5/2013 | Wipfel et al. | |
| 8,453,133 | B2 * | 5/2013 | Schwabe | G06F 8/52 717/159 |
| 8,458,717 | B1 | 6/2013 | Keagy et al. | |
| 8,520,589 | B2 | 8/2013 | Bhatt et al. | |
| 8,601,473 | B1 | 12/2013 | Aron et al. | |
| 8,868,538 | B2 | 10/2014 | Mital et al. | |
| 8,886,128 | B2 | 11/2014 | Hubner et al. | |
| 8,898,672 | B2 | 11/2014 | Shamilian et al. | |
| 9,043,452 | B2 * | 5/2015 | Fulton | H04L 41/0896 707/714 |
| 9,043,796 | B2 | 5/2015 | Tillier | |
| 9,058,219 | B2 * | 6/2015 | Jaisinghani | H04L 47/827 |
| 9,082,297 | B2 * | 7/2015 | Alexander | G08C 23/04 |
| 9,158,564 | B2 * | 10/2015 | Maity | G06F 9/5077 |
| 9,331,899 | B2 * | 5/2016 | Christopher | H04L 41/08 |
| 9,626,065 | B2 * | 4/2017 | Gimpl | G06F 3/0481 |

OTHER PUBLICATIONS

Jordan et al, "A Software Managed Stack Cache for Real-Time Systems", ACM, pp. 319-326, 2016.*

Cherubin et al, "Stack Size Estimation on Machine-Independent Intermediate Code for OpenCL Kernels" ACM, pp. 1-6, 2016.*

Corry, "Optimistic Stack Allocation for Java-Like Languages", ACM, pp. 162-173, 2006.*

Ju et al, "On Fault Resilience of OpenStack", ACM, pp. 1-16, 2013.*

Middha et al, "MTSS: Multi Task Stack Sharing for Embedded Systems", ACM, pp. 191-201, 2005.*

Google, The Android Open Source Project, 2008, 12 pages. https://android.googlesource.com/platform/dalvik/+/android-4.2.2_r1.1/vm/Thread.h.

"The extended European search report", European Patent Application No. 15173819.2, dated Dec. 17, 2015, European Patent Office, 9 pages.

Stevens, et al., "Asking for (and about) Permissions used by Android Apps", IEEE, pp. 31-40, 2013.

Szczesny et al., "On-the-fly Hardware Acceleration for Protocol Stack Procssing in Next Generation Mobile Devices", ACM, pp. 155-162, 2009.

Steinmetz, et al., "Cloud Computing Performance Benchmarking and Virtual Machine Launch Time", ACM, pp. 89-90, 2012.

Ju, et al., "On Fault Resilience of OpenStack", ACM, pp. 1-16, 2013.

Razavi, et al., "Scaling VM Deployment in an Open Source Cloud Stack", ACM, pp. 3-10, 2015.

Kocoloski, et al., "A case for Dual Stack Virtualization: Consolidating HPC and Commodity Applications in the Cloud", ACM, pp. 1-7, 2012.

* cited by examiner

800

```
// 'X' is the number of activities that may be pushed per application on the back stack 802 → If(device_characteristics == High_Memory [>2 GB] ) then
            #define X 12
        Else  If(device_characteristics == Medium_Memory [1 to 2 GB] ) then
            #define X 8
        Else  If(device_characteristics == Low_Memory [< 1 GB] ) then
            #define X 6

804 → // Find complex applications and label them
        For (all applications installed on the device)
        {
            If (number of activities per application > 10)
                Label the application type == COMPLEX
        }

806 → // determine memory usage of complex application that are currently running For (all applications in memory where LABEL == COMPLEX)
            Calculate the total memory used 808 → If Complex Application Memory Usage >60% of total available space in device then
                Set Complex Application Memory Usage Category == RED
        Else If Complex Application Memory Usage between 30 to 60% of total available space in
        device then
                Set Complex Application Memory Usage Category == YELLOW
        Else If Complex Application Memory Usage <= 30% of total available space in device then
                Set Complex Application Memory Usage Category == GREEN 810 → // calculate the usage history per user per complex application From the previous usage history stored in the device, label feature usage intensity 812 → If User uses >80% of the activities (features) from the application then
                Set  feature_usage == RED
        Else If User uses >60% and <=80% of the activities from the application then
                Set feature_usage == YELLOW
        Else If User uses <=60% of the activities from the application then
                Set feature_usage == GREEN
```

FIG. 8A

Sample Rules: — 136

850 — If ((Complex Application Memory Usage == GREEN) && (feature_usage== GREEN) && (Tolerable Response Time == High))
Then
    Set Application Back Stack Threshold Limit to X *(Depends based upon the Device Characteristics)*

852 — Else If ((Complex Application Memory Usage Category == GREEN) && (%age of Active Activities Category == GREEN) && (Tolerable Response Time == Medium))
Then
    Set Application Back Stack Threshold Limit to X+20%

Else If ((Complex Application Memory Usage Category == GREEN) && (%age of Active Activities Category == GREEN) && (Tolerable Response Time == Low))
Then
    Set Application Back Stack Threshold Limit to X+40%

Else If ((Complex Application Memory Usage Category == YELLOW) && (%age of Active Activities Category == GREEN) && (Tolerable Response Time == High))
Then
    Set Application Back Stack Threshold Limit to X+40%

Else If ((Complex Application Memory Usage Category == YELLOW) && (%age of Active Activities Category == YELLOW) && (Tolerable Response Time == High))
Then
    Set Application Back Stack Threshold Limit to X+60%

FIG. 8B

```
If (external connectivity == good) && (internal
storage status == 90% full) && (tolerable
response time == medium)

Then

CLOUD storage = TRUE
```

1500

┌─────────────────────────────────────────────────────────────┐
│ DETERMINE WHETHER A NUMBER OF ACTIVITIES OF AN APPLICATION THAT │
│ HAVE BEEN EXECUTED BY A DEVICE THAT EXECUTES THE APPLICATION IS │
│ LESS THAN OR EQUAL TO A BACK STACK SIZE LIMIT FOR AN IN-MEMORY │
│ BACK STACK FOR THE DEVICE THAT EXECUTES THE APPLICATION │
│ 1502 │
└─────────────────────────────────────────────────────────────┘
┌─────────────────────────────────────────────────────────────┐
│ IN RESPONSE TO A DETERMINATION THAT THE NUMBER OF THE ACTIVITIES │
│ OF THE APPLICATION THAT HAVE BEEN EXECUTED BY THE DEVICE THAT │
│ EXECUTES THE APPLICATION IS LESS THAN OR EQUAL TO THE BACK STACK │
│ SIZE LIMIT FOR THE IN-MEMORY BACK STACK FOR THE DEVICE THAT │
│ EXECUTES THE APPLICATION, PUSH SELECTED ONES OF THE ACTIVITIES OF │
│ THE APPLICATION TO THE IN-MEMORY BACK STACK FOR THE DEVICE THAT │
│ EXECUTES THE APPLICATION │
│ 1504 │
└─────────────────────────────────────────────────────────────┘
┌─────────────────────────────────────────────────────────────┐
│ IN RESPONSE TO A DETERMINATION THAT THE NUMBER OF THE ACTIVITIES │
│ OF THE APPLICATION THAT HAVE BEEN EXECUTED BY THE DEVICE THAT │
│ EXECUTES THE APPLICATION IS GREATER THAN THE BACK STACK SIZE LIMIT │
│ FOR THE IN-MEMORY BACK STACK FOR THE DEVICE THAT EXECUTES THE │
│ APPLICATION, PUSH THE SELECTED ONES OF THE ACTIVITIES OF THE │
│ APPLICATION TO AT LEAST ONE OF AN EXTERNAL ON-DEVICE BACK STACK │
│ FOR THE DEVICE THAT EXECUTES THE APPLICATION AND A CLOUD │
│ STORAGE BASED BACK STACK │
│ 1506 │
└─────────────────────────────────────────────────────────────┘

FIG. 15

INTELLIGENT APPLICATION BACK STACK MANAGEMENT

PRIORITY

This application is a Continuation of commonly assigned and co-pending U.S. patent application Ser. No. 14/476,270, filed Sep. 3, 2014, which claims priority to Indian patent application number 3438/CHE/2014, having a filing date of Jul. 11, 2014, the disclosures of which are hereby incorporated by reference in their entireties.

BACKGROUND

Mobile applications typically include a predetermined number of activities that are designed to interact with a user via a user interface of a mobile device such as a tablet, phone, watch, phablet, eyewear, etc. An activity may include a screen or an operation designed to interact with the user via the user interface of the mobile device. For example, a mobile application typically includes a predetermined number of activities that are designed to cater to user entertainment, implementation of micro tasks such as email, calendar, etc., and facilitation of user navigation (e.g., maps, etc.). Each such mobile application typically includes a first or main activity that may be used to start a new related activity, with the first or main activity being thereby designated as a suspended activity. The operating system (OS) of the mobile device typically pushes the suspended activities on to a back stack, and the OS then pulls out the suspended activities and makes them active when the user re-traces the workflow backwards. If the number of activities in the back stack exceeds a predetermined number of allowed back stack activities, the suspended activities and the application are typically terminated.

BRIEF DESCRIPTION OF DRAWINGS

Features of the present disclosure are illustrated by way of examples shown in the following figures. In the following figures, like numerals indicate like elements, in which:

FIGS. 8A and 8B respectively illustrate pseudo-code and rules for application back stack size determination, according to an example of the present disclosure;

FIG. 15 illustrates a method for intelligent application back stack management, according to an example of the present disclosure;

DETAILED DESCRIPTION

Figure 1:
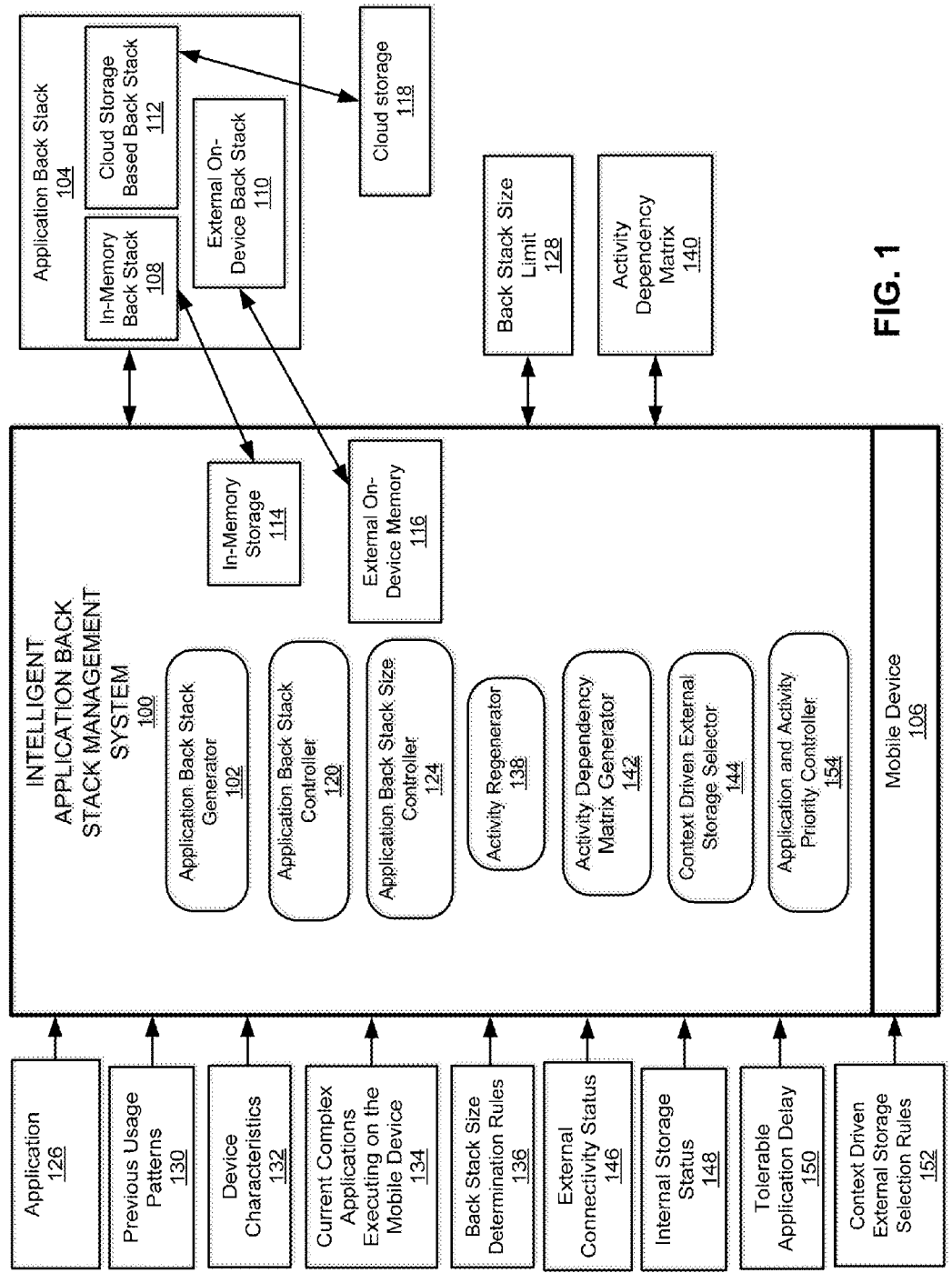
FIG. 1 illustrates a detailed architecture of an intelligent application back stack management system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

In mobile applications that typically include a predetermined number of activities, if the number of activities in a back stack exceeds a predetermined number of allowed back stack activities, suspended activities and the application are typically terminated. For example, mobile applications typically include two to four activities. With the increase of digital technology, digital enterprises are using technology as a competitive advantage in their internal and external operations, and mobile devices are becoming a tool of choice for interacting with the digital organization. With the advent of mobile devices with increased bandwidth and availability of inexpensive sensors, applications that used to reside on the enterprise servers are moving towards mobile devices.

Enterprises are also employing complex applications that are designed to take advantage of the digital infrastructure of the organization to implement their business processes. Such complex applications typically include several active activities ongoing at the same time. For example, a smart digitization application for child development services may include an activity to register beneficiaries, followed an activity to take attendance, an activity to look at food stock, an activity related to immunization reminders, an activity to analyze growth monitoring charts, etc. The navigation in such applications occurs from one activity to another as part of the workflow, but the user may trace back on to previous activities, correct any errors, or add new information and still maintain the context of all of the active activities.

For such complex applications, in a similar manner as typical mobile applications, each activity is typically associated with a user interface, and at any given time, only one activity is typically active. The OS typically pushes the suspended (i.e., non-active) activities on to a back stack, and the OS pulls out the suspended activity and makes it active when the user re-traces the workflow backwards. This application behavior is typical for desktop applications. However, with desktop type applications migrating downstream on to mobile devices, complex applications tend to fail. For example, typical mobile OSs terminate all the suspended activities and the application if the back stack exceeds a certain limit (e.g., three activities). Moreover, as multiple applications run on a mobile device, mobile OS typically does not allow one application to consume all of the resources, and terminates any such application.

In order to address at least the foregoing aspects, according to examples disclosed herein, an intelligent application back stack management system and a method for intelligent application back stack management are disclosed herein. The system and method disclosed herein provide an intelligent memory management layer over an existing mobile OS.

According to an example, the intelligent application back stack management system may include at least one processor, and an application back stack generator that is executed by the at least one processor to generate a first back stack for activities of an application that have been executed by a device that executes the application. The first back stack may include a back stack size limit. The application back stack generator may further generate at least one further back stack for selected ones of the activities of the application if a total number of the activities of the application and further activities of the application that have been executed by the device that executes the application exceeds the back stack size limit. The first back stack may be an in-memory back stack (e.g., an OS maintained back stack) for the device that executes the application, and the at least one further back stack (e.g., a user defined back stack) may include an external on-device back stack for the device that executes the application and/or a Cloud storage based back stack. The Cloud storage based back stack may be based on a model of data storage where digital data is stored in logical pools, physical storage spans across multiple servers, and the physical environment is typically owned and managed by a hosting company. The in-memory back stack may be used until the total number of the activities of the application and further activities of the application that have been executed by the device that executes the application exceeds the back stack size limit. The use of the external on-device back stack for the device that executes the application provides, for example, expansion capability for the in-memory back stack. Further, the use of the Cloud storage based back stack provides, for example, virtually unlimited expansion capability for the in-memory back stack. Thus, instead of applications being limited to a back stack size limit of the in-memory back stack, applications may utilize the external on-device back stack for the device that executes the application and/or the Cloud storage based back stack to expand the number of activities that may be traversed by a user. Moreover, the use of the Cloud storage based back stack may also reduce the storage requirements for the device that executes the application.

The intelligent application back stack management system described herein may further include an application back stack controller that is executed by the at least one processor to prioritize pushing of the activities of the application that have been executed by the device that executes the application and the further activities of the application that have been executed by the device that executes the application in order of the in-memory back stack for the device that executes the application, the external on-device back stack for the device that executes the application, and the Cloud storage based back stack. In this manner, pushing of activities to the in-memory back stack for the device that executes the application, the external on-device back stack for the device that executes the application, and the Cloud storage based back stack may be prioritized to facilitate processing.

For the intelligent application back stack management system described herein, the device may be a mobile device that includes a predetermined first storage capacity for the in-memory back stack for the device that executes the application, and a predetermined second storage capacity for the external on-device back stack for the device that executes the application. For example, the device may be a tablet, phone, watch, phablet, eyewear, etc.

For the intelligent application back stack management system described herein, the back stack size limit may be based on previous usage patterns related to the application, characteristics of the device that executes the application, and current applications that are being executed on the device that executes the application. In this manner, the back stack size limit may be predetermined or dynamically determined during application execution to facilitate processing of activities related to the application.

For the intelligent application back stack management system described herein, the back stack size limit may be further based on a tolerable response time related to the application, where the back stack size limit is generally decreased with increasing tolerable response time related to the application. Alternatively or additionally, the back stack size limit may be further based on an operational agreement and/or rule related to the application, for example, between an owner of the selected application, and an operator of the intelligent application back stack management system. In this manner, the back stack size limit may be similarly predetermined based on user preferences (e.g., tolerable response time) or dynamically determined during application execution (also based on user preferences) to facilitate processing of activities related to the application.

For the intelligent application back stack management system described herein, the application may be a complex application that includes an in-memory usage factor defined by the total number of the activities of the application that have been executed by the device that executes the application multiplied by an average memory usage (e.g., memory space taken by the activity based on images, other memory usage components) for the activities of the application and the further activities of the application that have been executed by the device that executes the application. For complex applications, the in-memory usage factor may represent, for example, a total device memory usage, where the total device memory usage is greater than an in-memory storage capacity related to the in-memory back stack for the device that executes the application. Thus, complex applications may include applications for which a number of activities and/or device resources used by such activities exceeds an in-memory storage capacity related to the in-memory back stack for the device that executes the application.

The intelligent application back stack management system described herein may further include an activity regenerator that is executed by the at least one processor to regenerate an activity of the selected ones of the activities that is pulled from the at least one further back stack. The activity regenerator may determine whether an activity of the selected ones of the activities that is pulled from the at least one further back stack is identified as a dependent activity in an activity dependency matrix, and in response to a determination that the activity of the selected ones of the activities that is pulled from the at least one further back stack is identified as the dependent activity in the activity dependency matrix, regenerate the activity of the selected ones of the activities that is pulled from the at least one further back stack. In this manner, outdated activities that are pulled from the external on-device back stack for the device that executes the application and/or the Cloud storage based back stack may be refreshed (i.e., made current) to incorporate any changes that have been implemented by other activities.

For the intelligent application back stack management system described herein, the dependent activity may include insert, update, or delete functionality that acts on the data and state being used or displayed in a major activity (i.e., a main activity as described herein).

The intelligent application back stack management system described herein may further include a context driven external storage selector that is executed by the at least one processor to select the external on-device back stack for the device that executes the application, or the Cloud storage based back stack for storage of the selected ones of the activities of the application based on an external connectivity status of the device that executes the application, an internal storage status of the device that executes the application, and a tolerable application delay. In this manner, the external on-device back stack for the device that executes the application, or the Cloud storage based back stack may be selected for storage of activities based on a variety of factors to facilitate processing of activities, and to further implement user preferences (e.g., related to tolerable application delay).

The intelligent application back stack management system described herein may further include an application and activity priority controller that is executed by the at least one processor to prioritize selected applications including the application or selected activities related to the selected applications for retention in the in-memory back stack for the device that executes the application. Prior to prioritization by the application and activity priority controller, the selected activities related to the selected applications are to be pushed to the external on-device back stack for the device that executes the application or the Cloud storage based back stack. For the intelligent application back stack management system described herein, the prioritization may be based on a tolerable response time related to the selected activities related to the selected applications and/or an operational rule related to the selected applications. In this manner, any high priority activities may be retained in the in-memory back stack for the device that executes the application to facilitate processing and/or improve security related to such activities. Similarly, any high priority applications may be prioritized over other lower priority applications, with activities for such high priority applications being retained in the in-memory back stack for the device that executes the application to facilitate processing and/or improve security related to such activities.

The intelligent application back stack management system and the method for intelligent application back stack management disclosed herein provide a technical solution to technical problems related, for example, to activity management for mobile devices, and for devices that generally include limited storage. The system and method disclosed herein provide the technical solution of an intelligent memory management layer over an existing mobile OS. For example, the system and method disclosed herein provide the technical solution of generating a first back stack for activities of an application that have been executed by a device that executes the application. The first back stack may include a back stack size limit. The system and method disclosed herein provide the technical solution of generating at least one further back stack for selected ones of the activities of the application if a total number of the activities of the application and further activities of the application that have been executed by the device that executes the application exceeds the back stack size limit. As described herein, the first back stack may be an in-memory back stack for the device that executes the application, and the at least one further back stack may include an external on-device back stack for the device that executes the application and/or a Cloud storage based back stack. The system and method disclosed herein further provide the technical solution of prioritizing pushing of the activities of the application that have been executed by the device that executes the application and the further activities of the application that have been executed by the device that executes the application in order of the in-memory back stack for the device that executes the application, the external on-device back stack for the device that executes the application, and the Cloud storage based back stack. The system and method disclosed herein further provide the technical solution of determining whether an activity of the selected ones of the activities that is pulled from the at least one further back stack is identified as a dependent activity in an activity dependency matrix, and in response to a determination that the activity of the selected ones of the activities that is pulled from the at least one further back stack is identified as the dependent activity in the activity dependency matrix, regenerating the activity of the selected ones of the activities that is pulled from the at least one further back stack. The system and method disclosed herein provide the technical solution of prioritizing selected applications including the application or selected activities related to the selected applications for retention in the in-memory back stack for the device that executes the application. Prior to prioritization by the application and activity priority controller, the selected activities related to the selected applications are to be pushed to the external on-device back stack for the device that executes the application or the Cloud storage based back stack.

FIG. 1 illustrates a detailed architecture of an intelligent application back stack management system 100, according to an example of the present disclosure. The system 100 may include an application back stack generator 102 to generate an application back stack 104 for a mobile device 106. The application back stack 104 may include an in-memory back stack 108, and an external on-device back stack 110 and/or a Cloud storage based back stack 112. The in-memory back stack 108, the external on-device back stack 110, and the Cloud storage based back stack 112 may be respectively stored in in-memory storage 114 (e.g., ROM (read only memory)), in external on-device memory 116 (e.g., RAM (random access memory), local device disk), and in an external Cloud storage 118.

Figure 2:
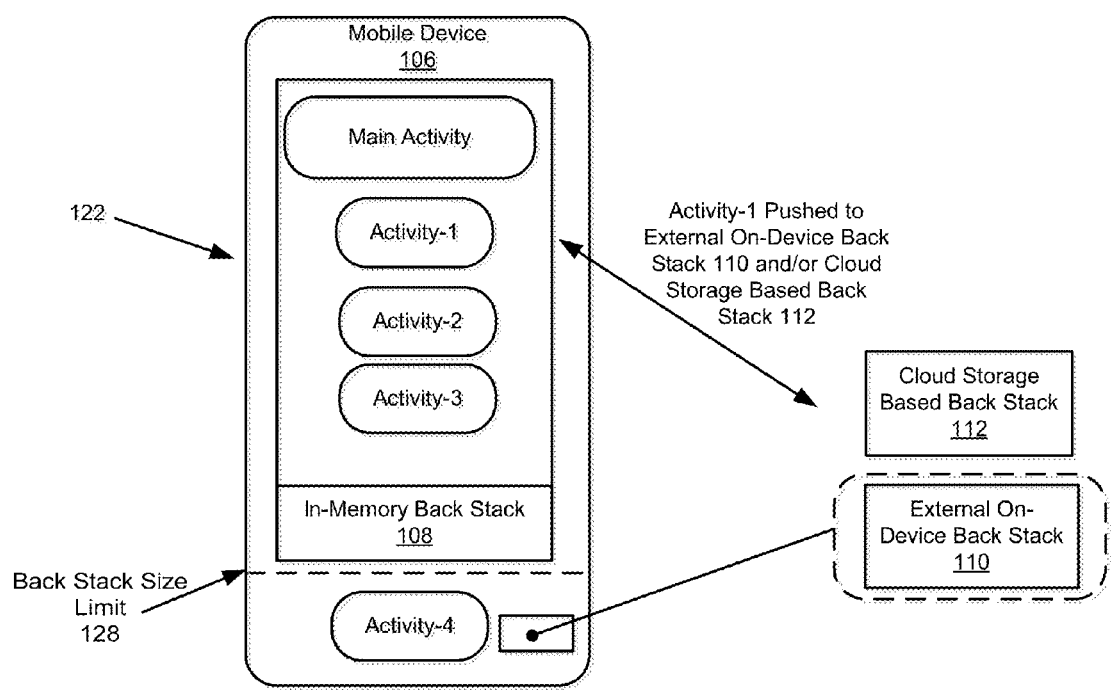
FIG. 2 illustrates pushing of activities to an external on-device back stack or a Cloud storage based back stack, according to an example of the present disclosure.

An application back stack controller 120 is to control the pushing of activities 122 (see FIG. 2) to the in-memory back stack 108, and to the external on-device back stack 110 and/or the Cloud storage based back stack 112. The activities 122 may include a main activity and additional activities (e.g., Activities 1-3 as shown in FIG. 2). The application back stack controller 120 may similarly control pulling of the activities 122 from the in-memory back stack 108, and from the external on-device back stack 110 and/or the Cloud storage based back stack 112.

An application back stack size controller 124 is to receive information related to an application 126, and to generate a back stack size limit 128 for the in-memory back stack 108. The application back stack size controller 124 may determine the back stack size limit 128 for the in-memory back stack 108 based on factors that include, for example, previous usage patterns 130, device characteristics 132 for the mobile device 106, and current complex applications 134 that are being executed on the mobile device 106. The determination of the back stack size limit 128 may be based on back stack size determination rules 136.

An activity regenerator 138 is to regenerate an activity that is pulled from the external on-device back stack 110, or the Cloud storage based back stack 112. The activity regenerator 138 may operate in conjunction with an activity dependency matrix 140 that is generated by an activity dependency matrix generator 142 to determine whether to regenerate the activity that is pulled from the external on-device back stack 110, or the Cloud storage based back stack 112.

A context driven external storage selector 144 is to select the external on-device back stack 110, or the Cloud storage based back stack 112 for storage of the application back stack 104. The context driven external storage selector 144 is to base the selection of the external on-device back stack 110, and the Cloud storage based back stack 112 on aspects such as external connectivity status 146, internal storage status 148, and tolerable application delay 150. The context driven external storage selector 144 is to implement context driven external storage selection rules 152 to select the external on-device back stack 110, or the Cloud storage based back stack 112 for storage of the application back stack 104.

An application and activity priority controller 154 is to prioritize certain applications and/or certain activities associated with applications, and operate in conjunction with the application back stack controller 120 to control the pushing of such activities to the external on-device back stack 110 and/or the Cloud storage based back stack 112. For example, based on the priority of certain applications and/or certain activities associated with such applications, the application and activity priority controller 154 may prevent the pushing of such activities to the external on-device back stack 110 and/or the Cloud storage based back stack 112, and maintain such activities in the in-memory back stack 108 to facilitate processing related to such activities.

As described herein, the elements of the intelligent application back stack management system 100 may be machine readable instructions stored on a non-transitory computer readable medium. In addition, or alternatively, the elements of the intelligent application back stack management system 100 may be hardware or a combination of machine readable instructions and hardware.

FIG. 2 illustrates pushing of activities to an external storage, according to an example of the present disclosure. In FIG. 2, various components of the intelligent application back stack management system 100 are omitted for facilitating a description of the pushing operation. Specifically, as shown in FIG. 2, when the activities stored on the in-memory back stack 108 reach the back stack size limit 128, the application back stack controller 120 may push all or some of the activities to the external on-device back stack 110, and/or the Cloud storage based back stack 112, thus freeing up the stack space for further chain of activities to execute. For example, in FIG. 2, the application back stack controller 120 may push the main activity, Activity-1, Activity-2, and Activity-3 to the external on-device back stack 110, and/or the Cloud storage based back stack 112 when Activity-4 is active. Alternatively, the application back stack controller 120 may push one activity at a time (e.g., starting with Activity-1) based on Activity-4 and additional active activities to the external on-device back stack 110, and/or the Cloud storage based back stack 112 as additional activities become active.

Figure 3:
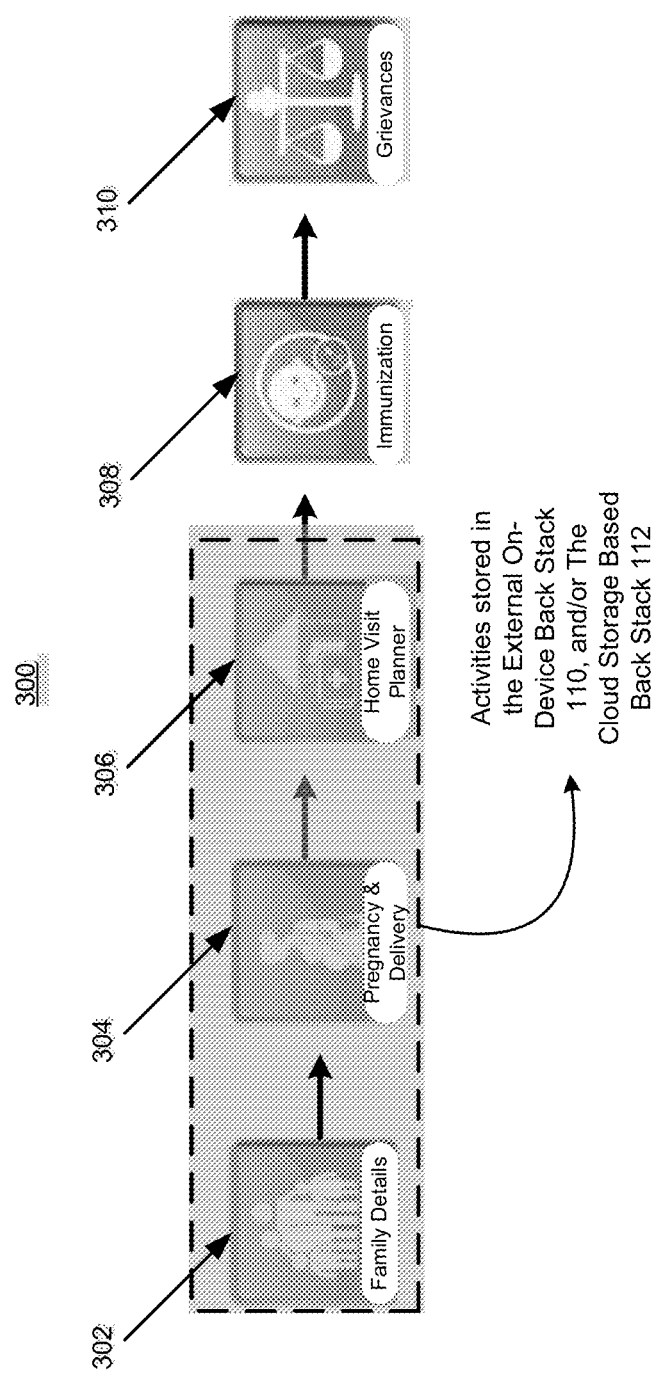
FIG. 3 illustrates a mobile public health application, according to an example of the present disclosure.

FIG. 3 illustrates a mobile public health application 300, according to an example of the present disclosure. In the mobile public health application 300, at any given instant, many activities may be performed. For example, a field worker may capture family details at 302, pregnancy history at 304, home visits plan at 306, immunization at 308, and raise grievances if any at 310. The field worker may traverse back and forth across all these activities, when visiting a family to capture details, advising, and performing lookups for data. When a user is in the immunization activity at 308, the activities family details at 302, pregnancy and delivery at 304, and home visit planner at 306 are on the activity stack in a suspended state in the in-memory back stack 108. If the back stack size limit 128 is set to three activities, the application back stack controller 120 may trigger a push from the in-memory storage 114 to the external on-device memory 116 and/or the Cloud storage 118, thus freeing up space for the in-memory back stack 108. This freeing up of the in-memory back stack 108 space may allow a user to perform other related activities, such as ascertaining grievances at 310 without the in-memory back stack 108 filling up.

Figure 4:
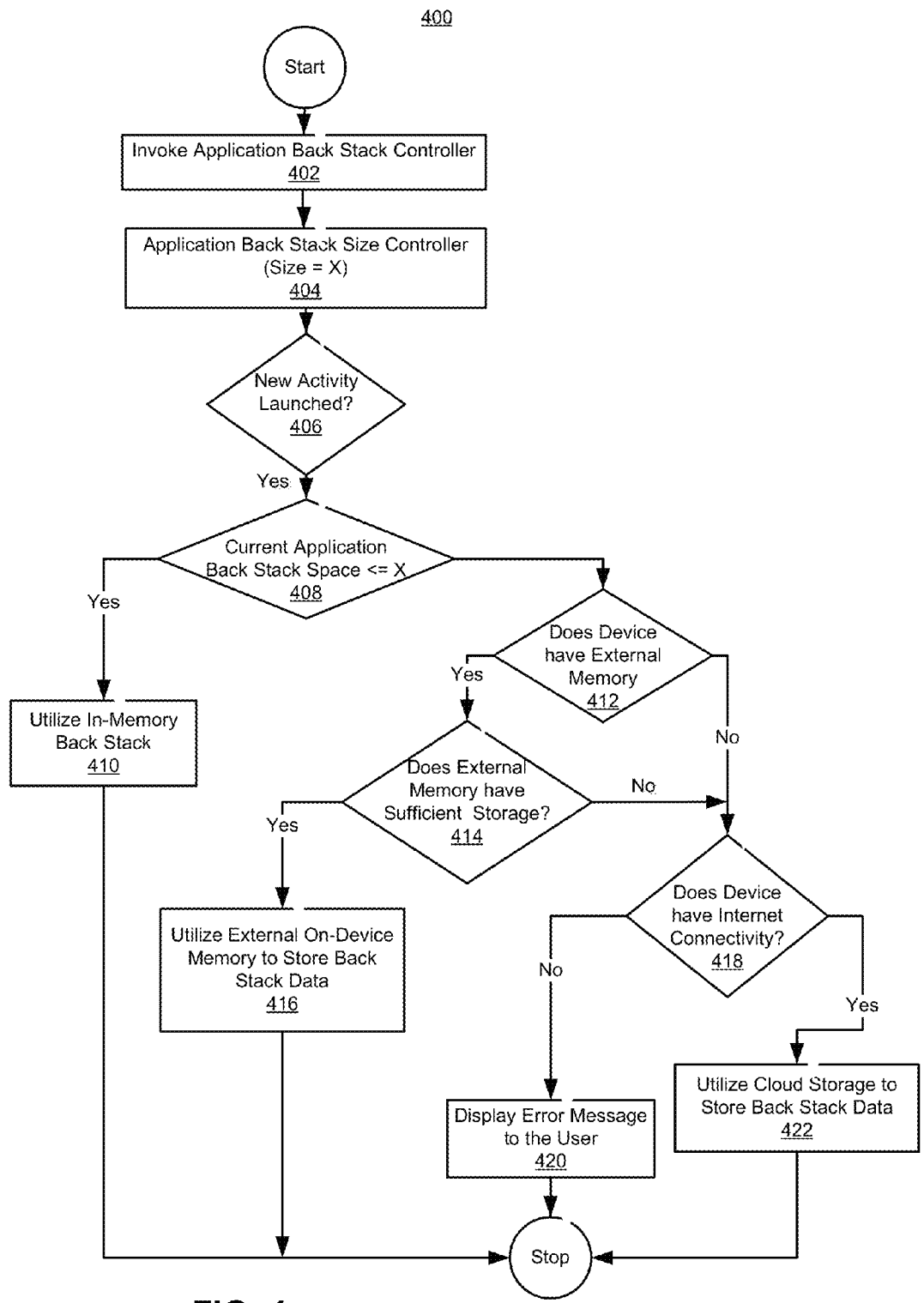
FIG. 4 illustrates a flowchart for pushing of an activity to the in-memory storage, external on-device memory, or Cloud storage, according to an example of the present disclosure.

FIG. 4 illustrates a flowchart 400 for pushing of an activity to the in-memory storage, external on-device memory, or Cloud storage, according to an example of the present disclosure. Referring to FIG. 4, at block 402, the application back stack controller 120 may be invoked to control the pushing of activities to the in-memory back stack 108, and to the external on-device back stack 110 and/or the Cloud storage based back stack 112.

At block 404, the application back stack size controller 124 may generate the back stack size limit 128 for the in-memory back stack 108. For example, the application back stack size controller 124 may generate the back stack size limit 128 as X.

At block 406, the application back stack controller 120 may determine whether a new activity is launched.

At block 408, the application back stack controller 120 may determine whether a current application back stack space is less than or equal to the back stack size limit 128 of X.

In response to a determination that the current application back stack space is less than or equal to the back stack size limit 128 of X, at block 410, the application back stack controller 120 may utilize the in-memory back stack 108.

In response to a determination that the current application back stack space is greater than the back stack size limit 128 of X, at block 412, the application back stack controller 120 may determine whether the mobile device 106 includes external on-device memory 116.

In response to a determination that the mobile device 106 includes the external on-device memory 116, at block 414, the application back stack controller 120 may determine whether the external on-device memory 116 includes sufficient storage.

In response to a determination that the external on-device memory 116 includes sufficient storage, at block 416, the application back stack controller 120 may utilize the external on-device memory 116 to store back stack data.

In response to a determination that the mobile device 106 does not include the external on-device memory 116, or in response to a determination that the external on-device memory 116 does not include sufficient storage, at block 418, the application back stack controller 120 may determine whether the mobile device 106 includes Internet connectivity.

In response to a determination that the mobile device 106 does not include Internet connectivity, at block 420, the application back stack controller 120 may display an error message to the user.

In response to a determination that the mobile device 106 includes Internet connectivity, at block 422, the application back stack controller 120 may utilize the external Cloud storage 118 to store back stack data.

Figure 5:
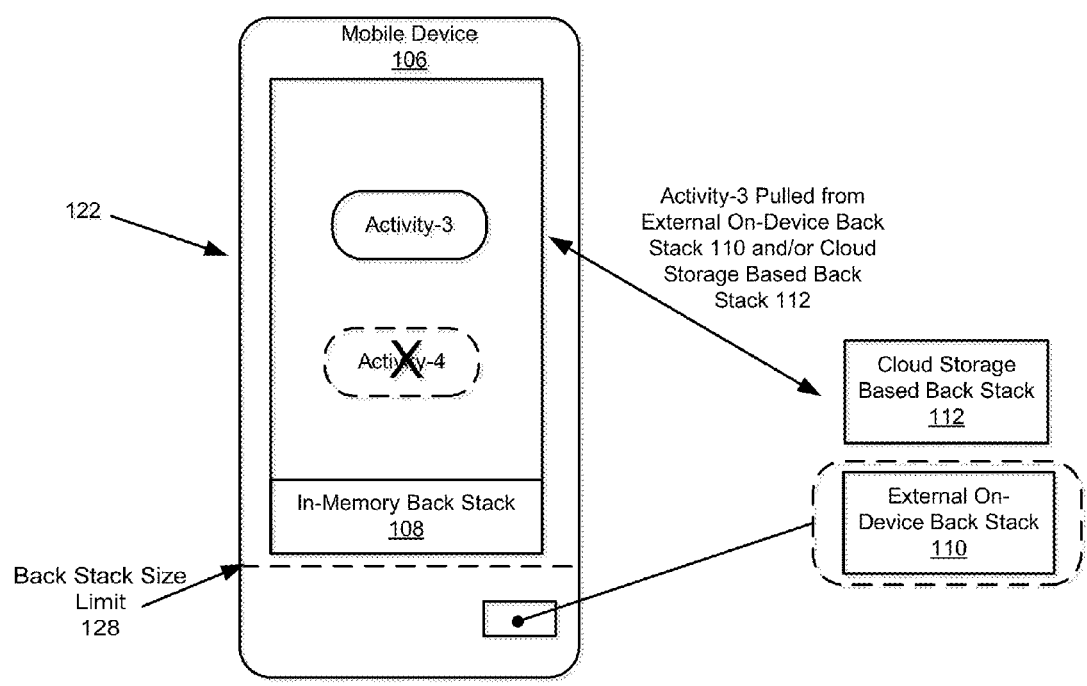
FIG. 5 illustrates pulling of a stored activity from the external on-device back stack or the Cloud storage based back stack, according to an example of the present disclosure.

FIG. 5 illustrates pulling of a stored activity from the external on-device back stack or the Cloud storage based back stack, according to an example of the present disclosure. As shown in FIG. 5, when Activity-4 is completed, a user may go back to the previous activity (e.g., Activity-3). In this case, the application back stack controller 120 may pull the externally stored Activity-3, and recreate the Activity-3 in the mobile device 106 to provide a seamless transition from Activity-4 back to Activity-3.

Figure 6:
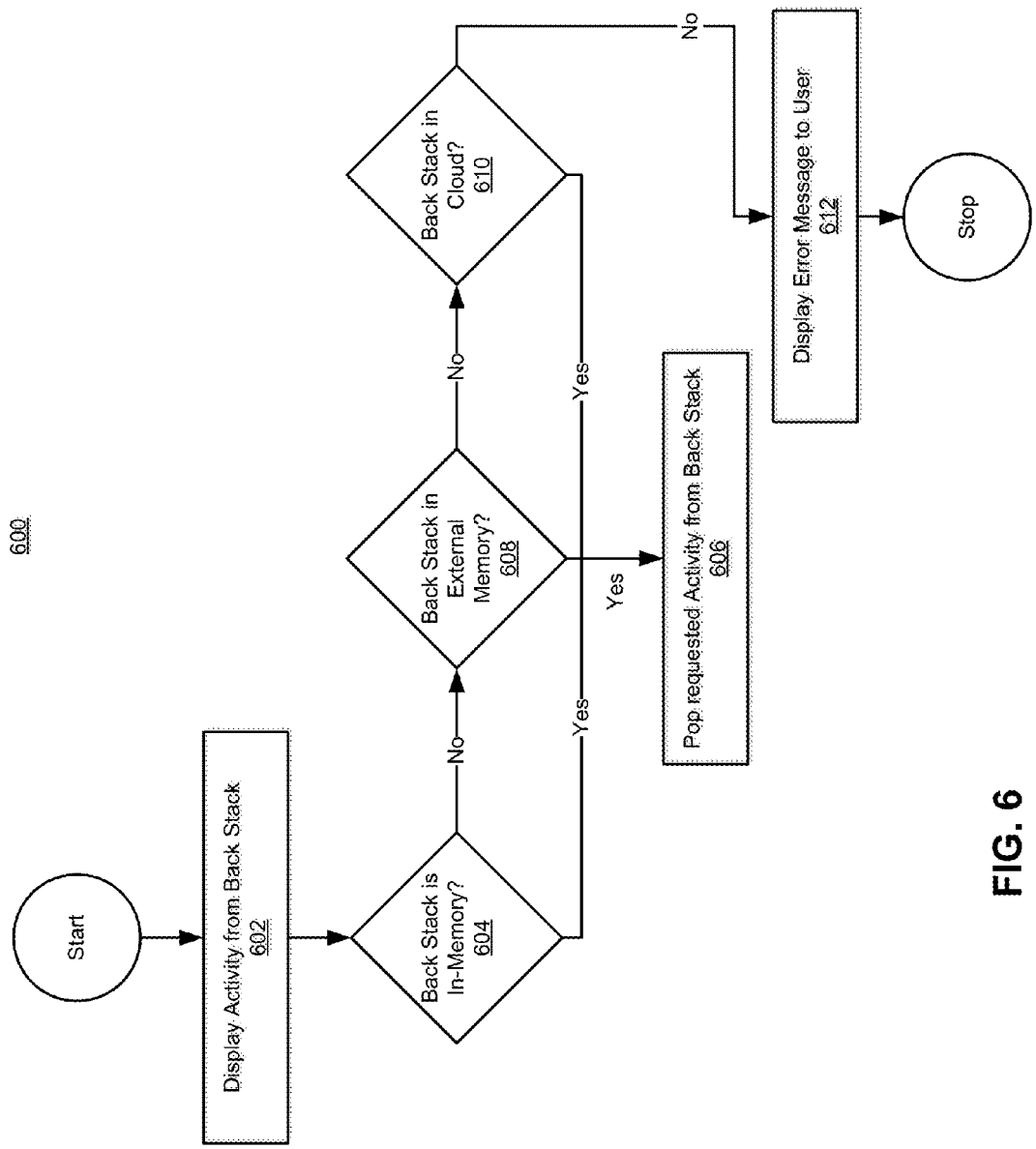
FIG. 6 illustrates a flowchart for popping of a requested activity from an in-memory back stack, the external on-device back stack, or the Cloud storage based back stack, according to an example of the present disclosure.

FIG. 6 illustrates a flowchart 600 for popping of a requested activity from the in-memory back stack 108, the external on-device back stack 110, or the Cloud storage based back stack 112, according to an example of the present disclosure. Referring to FIG. 6, at block 602, the application back stack controller 120 may display an activity from the application back stack 104.

At block 604, the application back stack controller 120 may determine whether the application back stack 104 is in in-memory storage 114 (i.e., the in-memory back stack 108).

In response to a determination that the application back stack 104 is in the in-memory storage 114 (i.e., the in-memory back stack 108), at block 606, the application back stack controller 120 may pop the requested activity from the back stack.

In response to a determination that the application back stack 104 is not in the in-memory storage 114 (i.e., the in-memory back stack 108), at block 608, the application back stack controller 120 may determine whether the application back stack 104 is in the external on-device memory 116 (i.e., the external on-device back stack 110). In response to a determination that the application back stack 104 is in the external on-device memory 116 (i.e., the external on-device back stack 110), at block 606, the application back stack controller 120 may pop the requested activity from the back stack.

In response to a determination that the application back stack 104 is not in the external on-device memory 116 (i.e., the external on-device back stack 110), at block 610, the application back stack controller 120 may determine whether the application back stack 104 is in the external Cloud storage 118 (i.e., the Cloud storage based back stack 112). In response to a determination that the application back stack 104 is in the external Cloud storage 118 (i.e., the Cloud storage based back stack 112), at block 606, the application back stack controller 120 may pop the requested activity from the back stack.

In response to a determination that the application back stack 104 is not in the external Cloud storage 118 (i.e., the Cloud storage based back stack 112), at block 612, an error message may be displayed.

Figure 7:
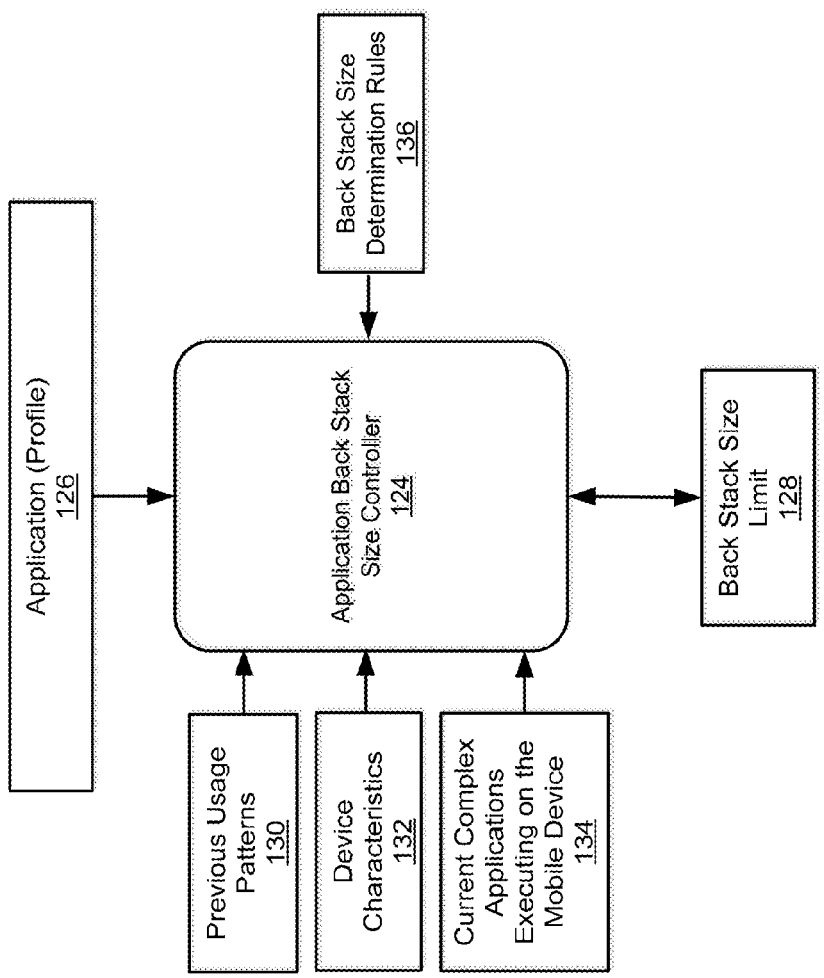
FIG. 7 illustrates an application back stack size controller, according to an example of the present disclosure.

FIG. 7 illustrates the application back stack size controller 124, according to an example of the present disclosure. The application back stack size controller 124 may generally determine and control the size of an application back stack (i.e., the back stack size limit 128) by accounting, for example, for previous usage patterns 130 (e.g., application usage, how many features are used, how much delay is tolerable as the user switches back to the previous activity, etc.), device characteristics 132 of the mobile device 106, and current complex applications executing on the mobile device 134 (e.g., whether there are other complex applications running at the same time). In this manner, the back stack size limit 128 may represent a predetermined back stack size limit 128 if the aforementioned factors are predetermined prior to application execution, or a dynamic back stack size limit 128 if the aforementioned factors are continuously determined during application execution. The back stack size limit 128 may represent a per device/user/application activity back stack limit. The application back stack size controller 124 may determine an optimum size for the in-memory back stack 108 that is set aside for a particular application and user. For example, if the previous user has been using a very limited set of functionality 90% of the time, and the mobile device 106 has other complex applications that are being executed, the application back stack size controller 124 may set a lower limit threshold for the size of the in-memory back stack 108. The application back stack size controller 124 may utilize the back stack size determination rules 136 to the determine the back stack size limit 128.

FIGS. 8A and 8B illustrate pseudo-code 800 and examples of the back stack size determination rules 136 for application back stack size determination by the application back stack size controller 124, according to an example of the present disclosure. Referring to FIG. 8A, at 802, the application back stack size controller 124 may determine a number of activities (i.e., X) that may be pushed per application on to the back stack. For example, if the device characteristics 132 include high memory (e.g., >2 GB), then the number of activities that may be pushed per application on to the back stack may be defined as 12. At 804, current complex applications executing on the mobile device 106 may be located and labeled as complex. For example, a complex application may be designated as any application that has greater than a predetermined number (e.g., 10) activities per application. Alternatively or additionally, a complex application may be designated as any application that includes an in-memory usage factor defined by a total number of the activities (e.g. 8 activities) of the application that have been executed by the device 106 multiplied by an average memory usage (e.g., 6 KB per activity) for the activities of the application and the further activities of the application that have been executed by the device 106, and where the in-memory usage factor (e.g., 48 KB) exceeds an in-memory storage capacity (e.g., 30 KB) related to the in-memory back stack 108 for the device 106. At 806, for all complex applications, the total memory usage may be determined. At 808, based on the determination at block 806, the complex application memory usage may be categorized, for example, as red, yellow, and green based on whether the memory usage is, for example, greater than approximately 60%, between approximately 30-60%, and less than or equal to approximately 30%. At 810, the application back stack size controller 124 may determine usage history per user per complex application from the previous usage patterns 130 (e.g., previous usage history) stored in the mobile device 106. At 812, the application back stack size controller 124 may label feature usage intensity, for example, as red, yellow, and green (e.g., if user uses >80% of the activities (features) from the application then set feature_usage==RED).

Referring to FIG. 8B, the application back stack size controller 124 may apply the back stack size determination rules 136, examples of which are illustrated in FIG. 8B. For example, as shown in FIG. 8B, the back stack size determination rules 136 may set an application back stack threshold limit to X, or increase the application back stack threshold limit to X+20%, X+40%, etc., depending on various factors. For example, as shown at 850, if complex application memory usage is green, feature usage is green, and tolerable response time is high, then the application back stack threshold limit may be set to X.

According to another example, as shown at 852, if complex application memory usage category is green, percentage of active activities category is green, and tolerable response time is medium, then the application back stack threshold limit may be set to X+20%. Thus, the application back stack size controller 124 may determine an optimal application back stack threshold limit that is tailored to a particular user (e.g., based on the previous usage patterns 130), independent of the application (e.g., the same application being used by multiple users) or device (e.g., the same device being used by multiple users) that is executing the application. The tolerable response time may represent a response time related to the application response time (e.g., for proper operation) and/or a user desired response time. With respect to the tolerable response time, generally a high tolerable response time may allow for use of slower forms of storage/retrieval of the application activities (e.g., the external on-device back stack 110 and/or the Cloud storage based back stack 112), as compared to the faster in-memory back stack 108.

Figure 9:
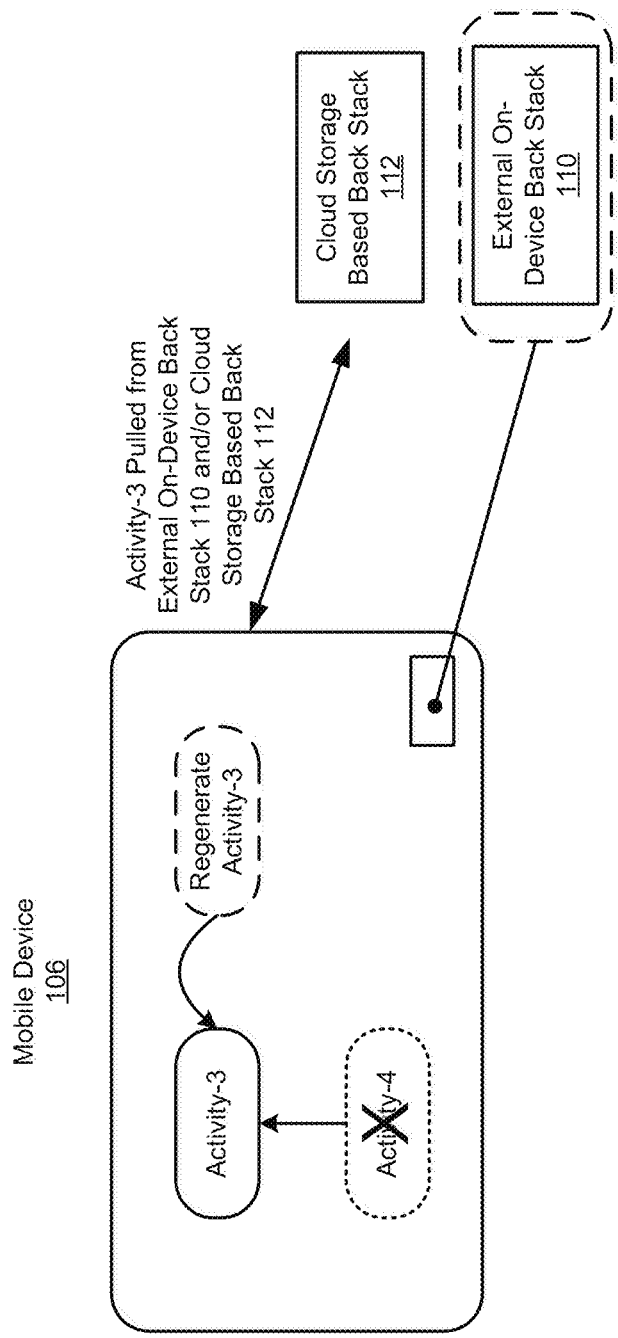
FIG. 9 illustrates regeneration of an activity with new data, according to an example of the present disclosure.
Figure 10:
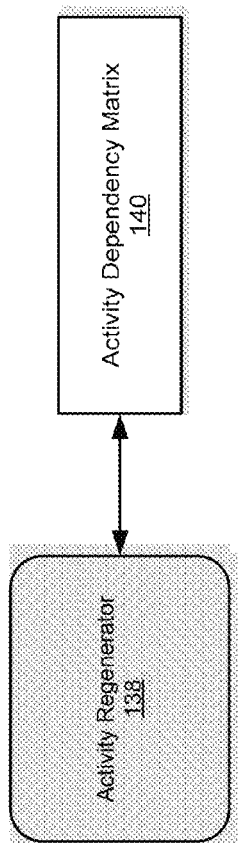
FIG. 10 illustrates an activity regenerator, according to an example of the present disclosure.

FIG. 9 illustrates regeneration of an activity with new data, according to an example of the present disclosure. Specifically, referring to FIG. 9, with respect to regeneration of an activity, any data entry or function exercised in Activity-4 may influence functional elements in Activity-3, for example, when a user returns to the previous activity. For example, Activity-4 may be a delete functionality that deletes registered family members in an application. Activity-3 may include functional elements that display all the current active registered family members. If a registered family member is deleted in Activity-4, the deleted registered family member should not show in Activity-3. However, absent regeneration of Activity-3, after Activity-3 is pushed to the external on-device back stack 110 or the Cloud storage based back stack 112, when Activity-3 is subsequently pulled out, Activity-3 will show the outdated data of active family members. In this regard, since the impact of changes in Activity-4 may also ripple up the chain to upper level activities, all impacted activities may be marked for regeneration by the activity regenerator 138. When such activities are popped out of the external on-device back stack 110 or the Cloud storage based back stack 112, the activity regenerator 138 may regenerate the stored activity with the new data set. In this regard, referring to FIG. 10, the activity regenerator 138 may utilize the activity dependency matrix 140 to determine which activities to regenerate.

Figure 11:
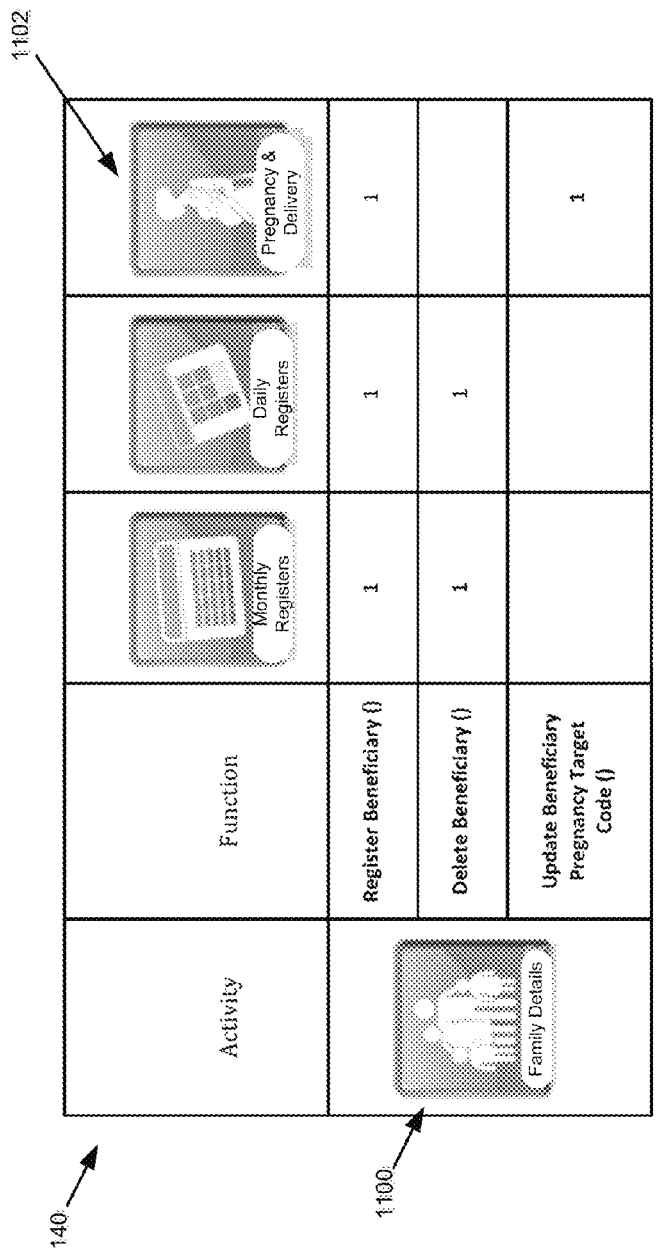
FIG. 11 illustrates an activity dependency matrix, according to an example of the present disclosure.

FIG. 11 illustrates an activity dependency matrix, according to an example of the present disclosure. Specifically, FIG. 11 illustrates an activity dependency matrix 140 for a public health mobile application. The application back stack controller 120 may push the current active activity to the application back stack 104 when a new activity is launched. However, execution of certain functions in the new activity may change the data associated with the activities that are already stored in the application back stack 104. The activity dependency matrix 140 may be used by the activity regenerator 138 to regenerate a stored activity with the new data set. For example, referring to FIG. 11, the Register Beneficiary ( ) function in the family details activity may register new family members. The newly added family members show up in the monthly registers activity, the daily registers activity, and in the pregnancy and delivery activity. According to an example, assume a user initiates the family details activity 1100 via the pregnancy and delivery activity 1102, then deletes the details of a pregnant member in the family details activity 1100, and then returns back to the previous activity (i.e., the pregnancy and delivery activity 1102). Without regeneration of the pregnancy and delivery activity 1102, the outdated data with the deleted pregnant member shows up in the pregnancy and delivery activity 1102. However, the activity regenerator 138 operating in conjunction with the activity dependency matrix 140 may regenerate the pregnancy and delivery activity 1102, and the new state may be reflected in the pregnancy and delivery activity 1102 (i.e., deleted pregnant member does not show up).

Figure 12:
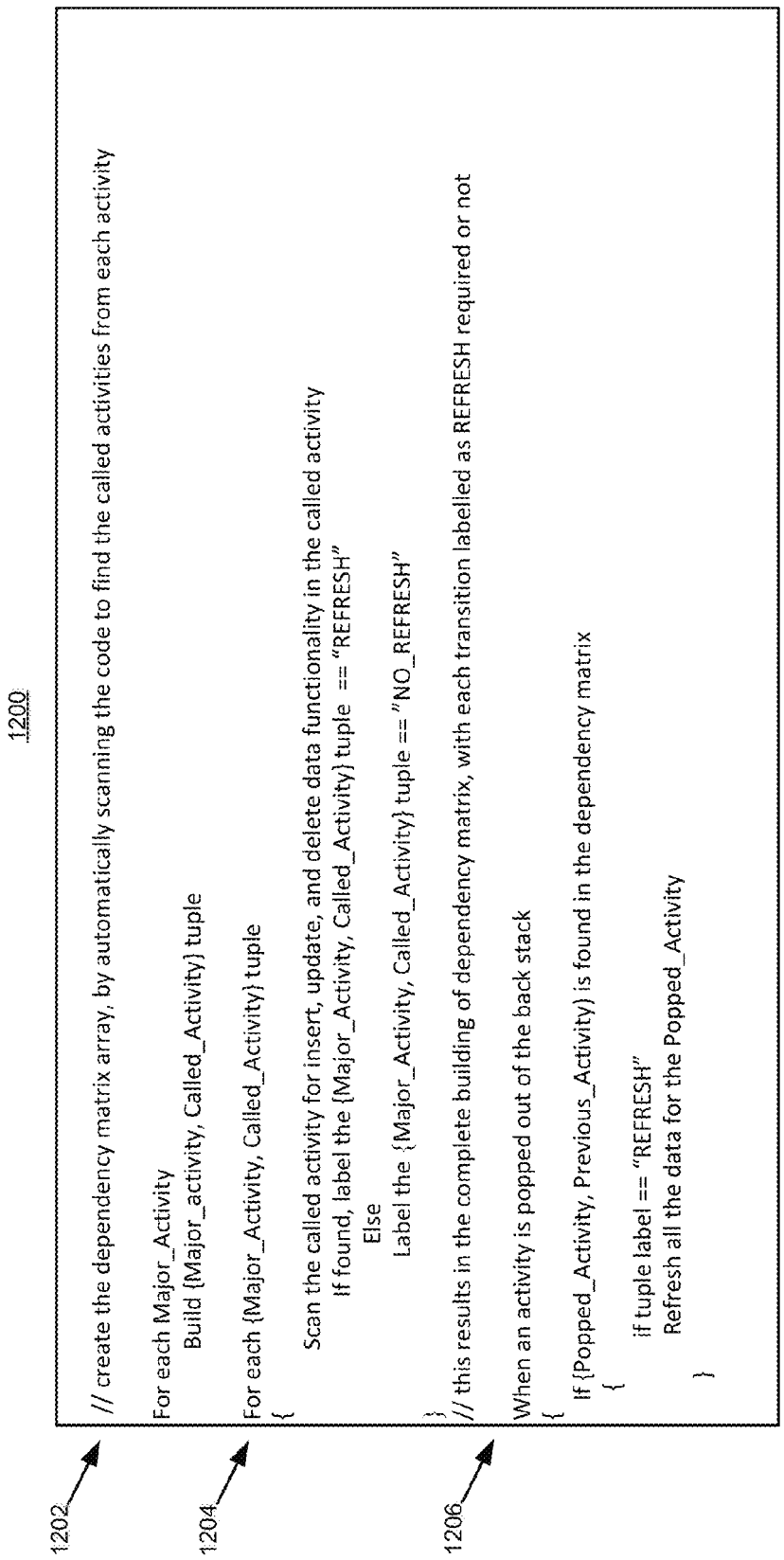
FIG. 12 illustrates pseudo-code for generation of the activity dependency matrix, according to an example of the present disclosure.

FIG. 12 illustrates pseudo-code 1200 for generation of the activity dependency matrix 140, according to an example of the present disclosure. Referring to FIG. 12, at 1202, the activity dependency matrix 140 may be created by scanning an application code to locate called activities from each activity. At 1204, for each major activity (i.e., main activity) and called activity tuple, for any insert, update, and delete functionality, the major activity and called activity tuple may be designated as "refresh" (i.e., to be generated). At 1206, when an activity is popped out of the external on-device back stack 110 or the Cloud storage based back stack 112, if the popped activity and previous activity are found in the activity dependency matrix 140, and if these activities belong to a tuple labeled "refresh", then all data for the popped activity may be refreshed (i.e., regenerated).

Figures 13, 14:
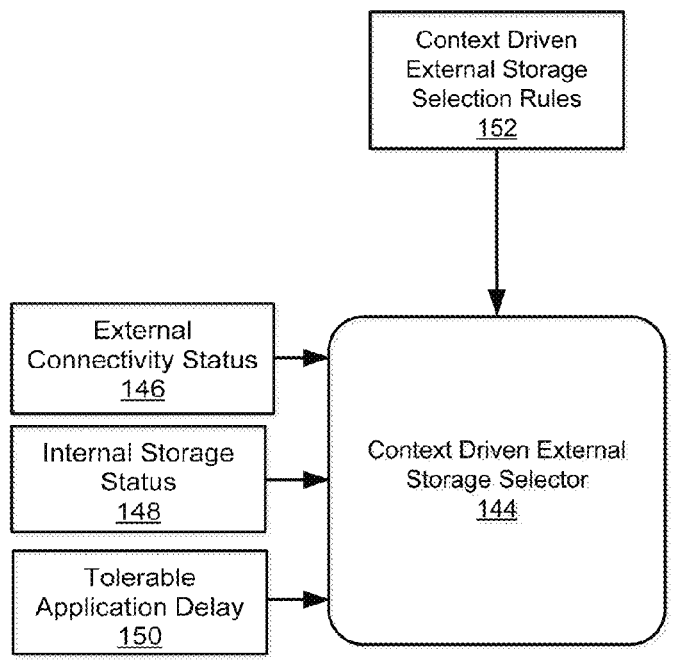
FIG. 13 illustrates a context driven external storage selector, according to an example of the present disclosure.
FIG. 14 illustrates pseudo-code for the context driven external storage selector, according to an example of the present disclosure.

FIG. 13 illustrates a context driven external storage selector 144, according to an example of the present disclosure. The context driven external storage selector 144 may generally select an optimum destination for storage of the application back stack 104 when the in-memory back stack 108 becomes full. Alternatively or additionally, the context driven external storage selector 144 may determine when it is appropriate to use the external on-device back stack 110 or the Cloud storage based back stack 112 instead of the in-memory back stack 108 even if the in-memory back stack 108 is not full. The context driven external storage selector 144 may analyze aspects such as the external connectivity status 146, the internal storage status 148, and tolerable application delay 150 to determine an optimum destination for storage of the application back stack 104. For example, referring to FIG. 14 that illustrates pseudo-code for the context driven external storage selector 144, when the external connectivity is good, the internal storage (i.e., the in-memory storage 114) status is 90% full, and the tolerable response time is medium, the context driven external storage selector 144 may select the external Cloud storage 118.

Referring again to FIG. 1, the application and activity priority controller 154 may prioritize certain applications and/or certain activities associated with applications, and operate in conjunction with the application back stack controller 120 to control the pushing of such activities to the external on-device back stack 110 and/or the Cloud storage based back stack 112. For example, based on the priority of certain applications and/or certain activities associated with such applications, the application and activity priority controller 154 may prevent the pushing of such activities to the external on-device back stack 110 and/or the Cloud storage based back stack 112, and maintain such activities in the in-memory back stack 108 to facilitate processing related to such activities.

Figure 16:
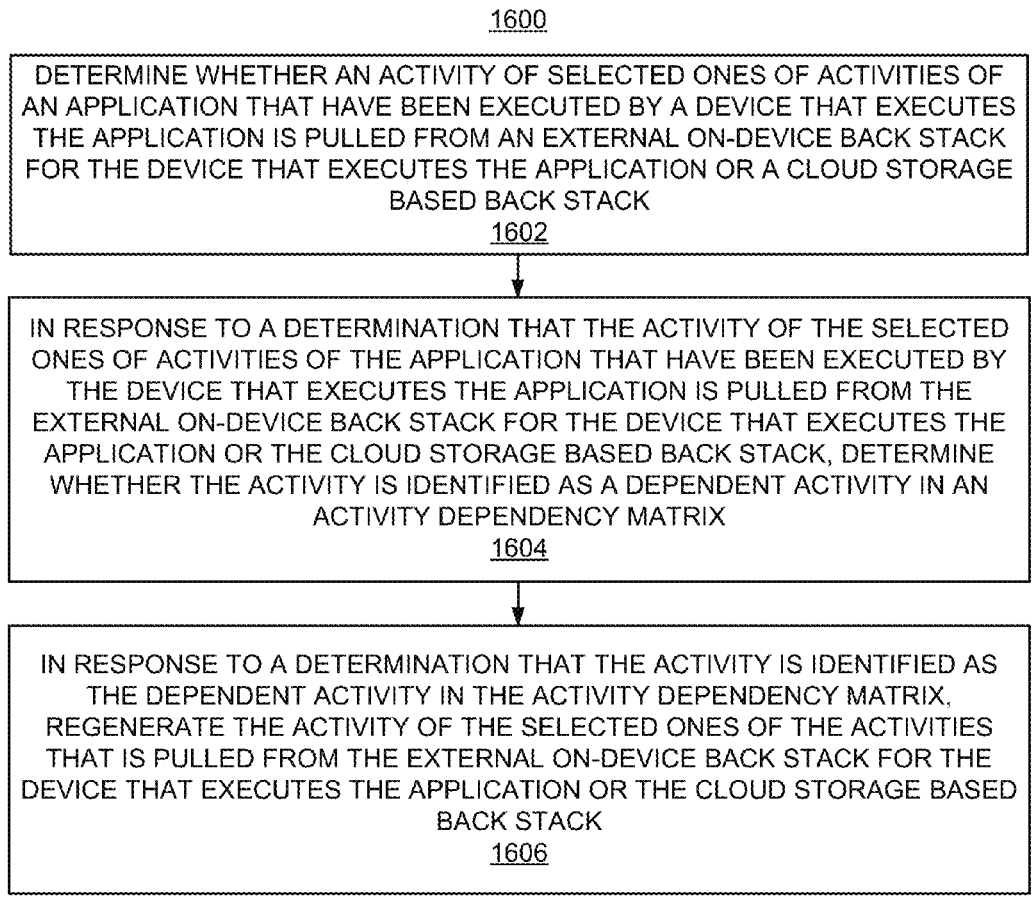
FIG. 16 illustrates further details of the method for intelligent application back stack management, according to an example of the present disclosure.

FIGS. 15 and 16 illustrate flowcharts of methods 1500 and 1600 for intelligent application back stack management, according to examples. The methods 1500 and 1600 may be implemented on the intelligent application back stack management system 100 described above with reference to FIGS. 1-14 by way of example and not limitation. The methods 1500 and 1600 may be practiced in other systems.

Referring to FIGS. 1 and 15, at block 1502, the method 1500 may include determining whether a number of activities of an application that have been executed by a device that executes the application is less than or equal to a back stack size limit for an in-memory back stack for the device that executes the application. For example, referring to FIG. 1, the application back stack controller 120 may determine whether a number of activities of the application 126 that have been executed by the device 106 that executes the application 126 is less than or equal to a back stack size limit 128 for an in-memory back stack 108 for the device 106 that executes the application 126.

At block 1504, in response to a determination that the number of the activities of the application that have been executed by the device that executes the application is less than or equal to the back stack size limit for the in-memory back stack for the device that executes the application, the method 1500 may include pushing selected ones of the activities of the application to the in-memory back stack for the device that executes the application. For example, referring to FIG. 1, in response to a determination that the number of the activities of the application 126 that have been executed by the device 106 that executes the application 126 is less than or equal to the back stack size limit 128 for the in-memory back stack 108 for the device 106 that executes the application 126, the application back stack controller 120 may push selected ones of the activities of the application 126 to the in-memory back stack 108 for the device 106 that executes the application 126.

At block 1506, in response to a determination that the number of the activities of the application that have been executed by the device that executes the application is greater than the back stack size limit for the in-memory back stack for the device that executes the application, the method 1500 may include pushing the selected ones of the activities of the application to at least one of an external on-device back stack for the device that executes the application and a Cloud storage based back stack. For example, referring to FIG. 1, in response to a determination that the number of the activities of the application 126 that have been executed by the device 106 that executes the application 126 is greater than the back stack size limit 128 for the in-memory back stack 108 for the device 106 that executes the application 126, the application back stack controller 120 may push the selected ones of the activities of the application 126 to the external on-device back stack 110 for the device 106 that executes the application 126 and/or the Cloud storage based back stack 112.

The method 1500 may further include determining the back stack size limit 128 during execution of the application 126. The back stack size limit 128 may be a dynamic back stack size limit that is changeable during execution of the application 126.

The method 1500 may further include regenerating an activity of the selected ones of the activities that is pulled from the external on-device back stack 110 for the device 106 that executes the application 126 or the Cloud storage based back stack 112.

The method 1500 may further include determining whether an activity of the selected ones of the activities that is pulled from the external on-device back stack 110 for the device 106 that executes the application 126 or the Cloud storage based back stack 112 is identified as a dependent activity in the activity dependency matrix 140, and in response to a determination that the activity of the selected ones of the activities that is pulled from the external on-device back stack 110 for the device 106 that executes the application 126 or the Cloud storage based back stack 112 is identified as the dependent activity in the activity dependency matrix 140, regenerating the activity of the selected ones of the activities that is pulled from the external on-device back stack 110 for the device 106 that executes the application 126 or the Cloud storage based back stack 112. For the method 1500 described herein, the dependent activity may include insert, update, or delete functionality that is related to a major activity.

Referring to FIGS. 1 and 16, at block 1602, the method 1600 may include determining whether an activity of selected ones of activities of an application that have been executed by a device that executes the application is pulled from an external on-device back stack for the device that executes the application or a Cloud storage based back stack. For example, referring to FIG. 1, the application back stack controller 120 may determine whether an activity of selected ones of activities of the application 126 that have been executed by a device 106 that executes the application 126 is pulled from the external on-device back stack 110 for the device 106 that executes the application 126 or the Cloud storage based back stack 112.

At block 1604, in response to a determination that the activity of the selected ones of activities of the application that have been executed by the device that executes the application is pulled from the external on-device back stack for the device that executes the application or the Cloud storage based back stack, the method 1600 may include determining whether the activity is identified as a dependent activity in an activity dependency matrix. For example, referring to FIG. 1, in response to a determination that the activity of the selected ones of activities of the application 126 that have been executed by the device 106 that executes the application 126 is pulled from the external on-device back stack 110 for the device 106 that executes the application 126 or the Cloud storage based back stack 112, the activity regenerator 138 may determine whether the activity is identified as a dependent activity in the activity dependency matrix 140.

At block 1606, in response to a determination that the activity is identified as the dependent activity in the activity dependency matrix, the method 1600 may include regenerating the activity of the selected ones of the activities that is pulled from the external on-device back stack for the device that executes the application or the Cloud storage based back stack. For example, referring to FIG. 1, in response to a determination that the activity is identified as the dependent activity in the activity dependency matrix 140, the activity regenerator 138 may regenerate the activity of the selected ones of the activities that is pulled from the external on-device back stack 110 for the device 106 that executes the application 126 or the Cloud storage based back stack 112.

Figure 17:
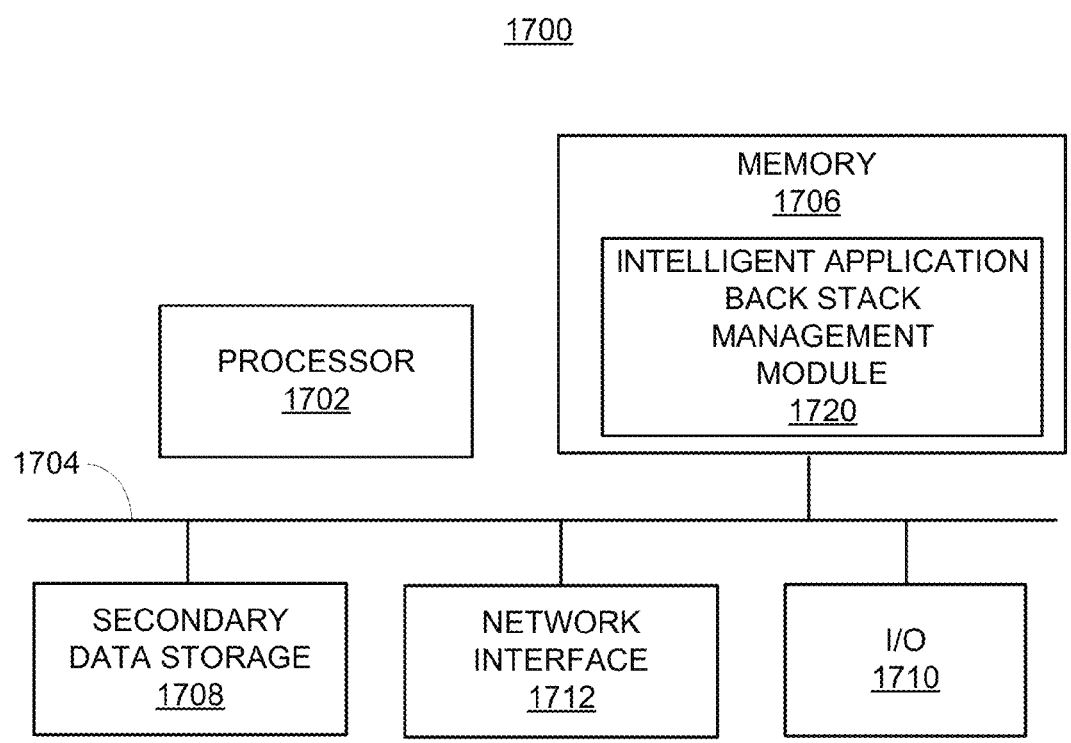
FIG. 17 illustrates a computer system, according to an example of the present disclosure.

FIG. 17 shows a computer system 1700 that may be used with the examples described herein. The computer system may represent a generic platform that includes components that may be in a server or another computer system. The computer system 1700 may be used as a platform for the system 100. The computer system 1700 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 1700 may include a processor 1702 that may implement or execute machine readable instructions performing some or all of the methods, functions and other processes described herein. Commands and data from the processor 1702 may be communicated over a communication bus 1704. The computer system may also include a main memory 1706, such as a random access memory (RAM), where the machine readable instructions and data for the processor 1702 may reside during runtime, and a secondary data storage 1708, which may be non-volatile and stores machine readable instructions and data. The memory and data storage are examples of computer readable mediums. The memory 1706 may include an intelligent application back stack management module 1720 including machine readable instructions residing in the memory 1706 during runtime and executed by the processor 1702. The intelligent application back stack management module 1720 may include the elements of the system 100 shown in FIG. 1.

The computer system 1700 may include an I/O device 1710, such as a keyboard, a mouse, a display, etc. The computer system may include a network interface 1712 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An intelligent application back stack management system comprising:
   at least one processor;
   an application back stack generator, executed by the at least one processor, to generate
      a first back stack for activities of an application that have been executed by a device that executes the application, wherein the first back stack includes a back stack size limit, and
      at least one further back stack associated with the activities of the application;
   an application back stack controller, executed by the at least one processor, to prioritize pushing of the activities of the application that have been executed by the device that executes the application and further activities of the application that have been executed by the device that executes the application in order of the first back stack, and the at least one further back stack; and
   an activity regenerator, executed by the at least one processor, to regenerate an activity that is pulled from the at least one further back stack.

2. The intelligent application back stack management system according to claim 1, wherein the device is a mobile device that includes
   a predetermined first storage capacity for the first back stack for the device that executes the application, and
   a predetermined second storage capacity for the at least one further back stack for the device that executes the application.

3. The intelligent application back stack management system according to claim 1, wherein the back stack size limit is based on
   characteristics of the device that executes the application.

4. The intelligent application back stack management system according to claim 1, wherein the back stack size limit is based on
   a tolerable response time related to the application, and wherein the back stack size limit is generally decreased with increasing tolerable response time related to the application.

5. The intelligent application back stack management system according to claim 1, wherein the application is a complex application that includes an in-memory usage factor defined by a total number of the activities of the application that have been executed by the device that executes the application multiplied by an average memory usage for the activities of the application and further activities of the application that have been executed by the device that executes the application, and wherein the in-memory usage factor exceeds an in-memory storage capacity related to the first back stack for the device that executes the application.

6. The intelligent application back stack management system according to claim 1, wherein the activity regenerator is to regenerate the activity that is pulled from the at least one further back stack by:
   determining whether the activity that is pulled from the at least one further back stack is identified as a dependent activity in an activity dependency matrix; and
   in response to a determination that the activity that is pulled from the at least one further back stack is identified as the dependent activity in the activity dependency matrix, regenerating the activity that is pulled from the at least one further back stack.

7. The intelligent application back stack management system according to claim 6, wherein the dependent activity includes insert, update, or delete functionality that is related to a major activity.

8. The intelligent application back stack management system according to claim 1, further comprising:
   a context driven external storage selector, executed by the at least one processor, to select the first back stack for the device that executes the application, or the at least one further back stack for storage of selected ones of the activities of the application based on an external connectivity status of the device that executes the application, an internal storage status of the device that executes the application, and a tolerable application delay.

9. The intelligent application back stack management system according to claim 1, further comprising:
an application and activity priority controller, executed by the at least one processor, to prioritize selected applications including the application or selected activities related to the selected applications for retention in the first back stack for the device that executes the application, wherein prior to prioritization by the application and activity priority controller, the selected activities related to the selected applications are to be pushed to the at least one further back stack for the device that executes the application.

10. The intelligent application back stack management system according to claim 9, wherein the prioritization is based on at least one of a tolerable response time related to the selected activities related to the selected applications and an operational rule related to the selected applications.

11. A method for intelligent application back stack management, the method comprising:
generating, by at least one processor, a first back stack for activities of an application that have been executed by a device that executes the application, wherein the first back stack includes a back stack size limit;
generating, by the at least one processor, at least one further back stack associated with the activities of the application; and
regenerating, by the at least one processor, an activity that is pulled from the at least one further back stack by
determining whether the activity that is pulled from the at least one further back stack for the device that executes the application is identified as a dependent activity in an activity dependency matrix, and
in response to a determination that the activity that is pulled from the at least one further back stack for the device that executes the application is identified as the dependent activity in the activity dependency matrix, regenerating the activity that is pulled from the at least one further back stack for the device that executes the application.

12. The method for intelligent application back stack management according to claim 11, further comprising:
determining, by the at least one processor, the back stack size limit during execution of the application, wherein the back stack size limit is a dynamic back stack size limit that is changeable during execution of the application.

13. The method for intelligent application back stack management according to claim 11, wherein the dependent activity includes insert, update, or delete functionality that is related to a major activity.

14. A non-transitory computer readable medium having stored thereon machine readable instructions for intelligent application back stack management, the machine readable instructions when executed cause a processor to:
generate a first back stack for activities of an application that have been executed by a device that executes the application, wherein
the first back stack includes a back stack size limit that is based on a tolerable response time related to the application, and
the back stack size limit is generally decreased with increasing tolerable response time related to the application;
generate at least one further back stack associated with the activities of the application; and
regenerate an activity that is pulled from the at least one further back stack.

15. The non-transitory computer readable medium of claim 14, further comprising machine readable instructions, when executed, further cause the processor to:
select the at least one further back stack for the device that executes the application for storage of selected ones of the activities of the application based on an external connectivity status of the device that executes the application, an internal storage status of the device that executes the application, and a tolerable application delay.

16. The non-transitory computer readable medium of claim 14, further comprising machine readable instructions, when executed, further cause the processor to:
prioritize pushing of the activities of the application that have been executed by the device that executes the application and further activities of the application that have been executed by the device that executes the application in order of the first back stack, and the at least one further back stack.

17. The non-transitory computer readable medium of claim 14, wherein the device is a mobile device that includes
a predetermined first storage capacity for the first back stack for the device that executes the application, and
a predetermined second storage capacity for the at least one further back stack for the device that executes the application.

18. The non-transitory computer readable medium of claim 14, wherein the back stack size limit is further based on
characteristics of the device that executes the application.

19. The non-transitory computer readable medium of claim 14, wherein the application is a complex application that includes an in-memory usage factor defined by a total number of the activities of the application that have been executed by the device that executes the application multiplied by an average memory usage for the activities of the application and further activities of the application that have been executed by the device that executes the application, and wherein the in-memory usage factor exceeds an in-memory storage capacity related to the first back stack for the device that executes the application.

20. The non-transitory computer readable medium of claim 14, further comprising machine readable instructions, when executed, further cause the processor to:
determine whether the activity that is pulled from the at least one further back stack is identified as a dependent activity in an activity dependency matrix; and
in response to a determination that the activity that is pulled from the at least one further back stack is identified as the dependent activity in the activity dependency matrix, regenerate the activity that is pulled from the at least one further back stack.

* * * * *